(12) United States Patent
Lein et al.

(10) Patent No.: US 11,097,785 B2
(45) Date of Patent: Aug. 24, 2021

(54) AUTOMOBILE HOOD FOR DECOUPLED PEDESTRIAN SAFETY AND DURABILITY

(71) Applicant: VOLVO CAR CORPORATION, Gothenburg (SE)

(72) Inventors: Thord Lein, Gothenburg (SE); Renaud Gutkin, Gothenburg (SE); Johan Sparlund, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 121 days.

(21) Appl. No.: 16/517,332

(22) Filed: Jul. 19, 2019

(65) Prior Publication Data
US 2021/0016839 A1    Jan. 21, 2021

(51) Int. Cl.
| B60J 7/00 | (2006.01) |
| B62D 25/12 | (2006.01) |
| B60R 21/34 | (2011.01) |
| B62D 25/10 | (2006.01) |

(52) U.S. Cl.
CPC .............. *B62D 25/12* (2013.01); *B60R 21/34* (2013.01); *B62D 25/105* (2013.01)

(58) Field of Classification Search
CPC ................ A62B 17/04; A45D 20/22; A47B 2003/0821; A47B 3/0818; B08B 15/023; B62D 25/081; C01B 32/55; B60H 1/28; F24F 7/02; F25D 3/12
See application file for complete search history.

(56) References Cited

U.S. PATENT DOCUMENTS

| 4,826,226 A | * | 5/1989 | Klie | ........................ | B60R 19/22 293/120 |
| 5,115,878 A | * | 5/1992 | Hayata | .................... | B60R 21/00 180/69.21 |
| 5,340,178 A | * | 8/1994 | Stewart | .................. | B60R 19/18 293/122 |
| 5,833,024 A | * | 11/1998 | Kaneko | ................ | B62D 25/105 180/69.2 |
| 6,209,934 B1 | * | 4/2001 | Sakuma | .................. | B60R 19/18 293/120 |

(Continued)

FOREIGN PATENT DOCUMENTS

| EP | 1514747 A1 | 3/2005 |
| EP | 1714856 A1 | 10/2006 |

(Continued)

OTHER PUBLICATIONS

European Search Report dated Sep. 14, 2020 from corresponding European Patent Application No. 20186505.2; 5 pages.

*Primary Examiner* — Kiran B Patel
(74) *Attorney, Agent, or Firm* — Berenato & White, LLC

(57) ABSTRACT

The invention relates to an automobile hood assembly containing an inner hood, an outer hood, and a core sandwiched between the inner and outer hoods. The inner hood is constructed to provide strength and stiffness to the hood assembly; and the outer hood and core are constructed to provide energy absorption to provide pedestrian safety in case of pedestrian collision. The automobile hood assembly decouples the stiffness and energy absorption requirements of an automobile hood, so that those two design criteria may be accomplished independent of each other.

17 Claims, 4 Drawing Sheets

(56) References Cited

U.S. PATENT DOCUMENTS

| | | | |
|---|---|---|---|
| 6,746,061 B1* | 6/2004 | Evans | B60R 19/18 |
| | | | 293/120 |
| 7,147,273 B2* | 12/2006 | Ikeda | B60R 21/34 |
| | | | 296/193.11 |
| 7,399,028 B1* | 7/2008 | Castillo | B62D 29/043 |
| | | | 180/274 |
| 8,052,198 B2* | 11/2011 | Seksaria | B62D 25/105 |
| | | | 296/187.04 |
| 9,278,715 B2* | 3/2016 | Steinhilb | B62D 25/105 |
| 9,573,626 B2 | 2/2017 | Lindmark et al. | |
| 9,783,236 B1 | 10/2017 | Rivera et al. | |
| 10,092,055 B2* | 10/2018 | Hector, Jr. | B32B 17/00 |
| 2003/0213635 A1 | 11/2003 | Ryan et al. | |
| 2004/0021342 A1* | 2/2004 | Fujimoto | B60R 21/34 |
| | | | 296/193.11 |
| 2004/0182616 A1* | 9/2004 | Mason | B62D 25/105 |
| | | | 180/69.21 |
| 2005/0212331 A1* | 9/2005 | Tsushima | B62D 25/12 |
| | | | 296/193.11 |
| 2006/0006698 A1 | 1/2006 | Ishikawa et al. | |
| 2007/0132279 A1* | 6/2007 | Donabedian | B62D 25/105 |
| | | | 296/193.11 |
| 2009/0026807 A1* | 1/2009 | Wang | B62D 25/105 |
| | | | 296/193.11 |
| 2009/0121519 A1* | 5/2009 | Ackland | B62D 25/105 |
| | | | 296/187.09 |
| 2010/0066127 A1* | 3/2010 | Goda | F02M 35/10019 |
| | | | 296/193.11 |
| 2010/0201139 A1* | 8/2010 | Hashimura | B60R 19/18 |
| | | | 293/133 |
| 2010/0230981 A1* | 9/2010 | Hock | B60R 19/18 |
| | | | 293/132 |
| 2011/0169303 A1* | 7/2011 | Ikeda | B60R 21/34 |
| | | | 296/193.11 |
| 2011/0204663 A1* | 8/2011 | Baccouche | B60R 19/18 |
| | | | 293/102 |
| 2012/0211297 A1* | 8/2012 | Ralston | F16F 7/12 |
| | | | 180/274 |
| 2012/0228889 A1* | 9/2012 | Haneda | B60R 19/18 |
| | | | 293/132 |
| 2013/0181484 A1* | 7/2013 | Grattan | B62D 25/105 |
| | | | 296/193.11 |
| 2014/0091584 A1* | 4/2014 | McConnell | B60R 19/18 |
| | | | 293/120 |
| 2014/0110971 A1* | 4/2014 | Ray | B60R 21/34 |
| | | | 296/187.09 |
| 2015/0307045 A1* | 10/2015 | Matecki | B60R 19/18 |
| | | | 293/122 |
| 2016/0101753 A1* | 4/2016 | Higashimachi | B60R 21/0136 |
| | | | 293/117 |
| 2016/0114747 A1* | 4/2016 | Ishitobi | B60R 19/18 |
| | | | 293/120 |
| 2016/0167609 A1* | 6/2016 | Corwin | B60R 19/18 |
| | | | 293/120 |
| 2016/0207482 A1* | 7/2016 | Tachibana | B60R 19/18 |
| 2016/0280163 A1* | 9/2016 | Matecki | E04C 3/06 |
| 2016/0347270 A1* | 12/2016 | Higashimachi | B60R 19/48 |
| 2017/0043735 A1* | 2/2017 | Yamaguchi | B60R 19/483 |
| 2017/0144619 A1* | 5/2017 | Shamoto | B60R 19/023 |
| 2017/0241191 A1* | 8/2017 | Farooq | B62D 29/04 |
| 2017/0259855 A1* | 9/2017 | Hammer | B62D 25/105 |
| 2017/0274937 A1* | 9/2017 | Hammer | B62D 25/105 |
| 2018/0037179 A1* | 2/2018 | Steinebach | B23K 31/02 |
| 2018/0056352 A1* | 3/2018 | Weykamp | C22F 1/04 |
| 2018/0162302 A1* | 6/2018 | Kitakata | B60R 19/18 |
| 2018/0208138 A1* | 7/2018 | Wakabayashi | G01L 5/00 |
| 2018/0257586 A1* | 9/2018 | Kitakata | B60R 19/03 |
| 2018/0257589 A1* | 9/2018 | Kawamura | B60R 19/24 |
| 2018/0361968 A1* | 12/2018 | Yatsunami | B60R 19/023 |
| 2018/0370469 A1* | 12/2018 | Shibata | B60R 19/18 |
| 2019/0084512 A1* | 3/2019 | Takayanagi | B60R 19/22 |
| 2019/0256023 A1* | 8/2019 | Tashiro | B60R 19/34 |
| 2019/0270421 A1* | 9/2019 | Tashiro | B60R 19/24 |
| 2019/0315305 A1* | 10/2019 | Hammer | B62D 25/105 |
| 2020/0031087 A1* | 1/2020 | Miura | B32B 3/12 |
| 2020/0086815 A1* | 3/2020 | Koga | B60R 19/18 |
| 2020/0139910 A1* | 5/2020 | Maeda | B60R 19/03 |
| 2020/0339052 A1* | 10/2020 | Rebstock | B21D 28/26 |
| 2020/0353987 A1* | 11/2020 | Yoshida | B62D 21/152 |
| 2020/0353993 A1* | 11/2020 | Yoshida | B60R 19/02 |
| 2021/0024022 A1* | 1/2021 | Matecki | B60R 19/12 |
| 2021/0039574 A1* | 2/2021 | Unal | B60R 19/02 |
| 2021/0094495 A1* | 4/2021 | Park | B60R 21/0136 |

FOREIGN PATENT DOCUMENTS

| | | |
|---|---|---|
| JP | 2008302749 A | 12/2008 |
| KR | 101872634 B1 | 6/2018 |

* cited by examiner

AUTOMOBILE HOOD FOR DECOUPLED PEDESTRIAN SAFETY AND DURABILITY

FIELD OF THE INVENTION

This invention relates to an automobile hood assembly. In particularly, the hood assembly contains an inner hood, an outer hood, and a core sandwiched between the inner and outer hoods. The inner hood is constructed to provide strength and stiffness to the hood assembly; and the outer hood and core is constructed to provide energy absorption to provide pedestrian safety in case of pedestrian collision.

BACKGROUND OF THE INVENTION

When an automobile collides with a pedestrian (or bicyclist, motorcyclist, or other persons exterior to the automobile), it is highly likely that the pedestrian would suffer serious injury or death due to the impact energy, usually by impact of the pedestrian's head with the hood. In the event of a collision, it is desirable for the hood to have the ability to absorb energy, thereby dissipating the energy to which the pedestrian involved in the collision may otherwise be subjected.

As shown in FIG. 1, a current hood structure 100 usually contains an outer hood 102 formed of a relatively thin sheet of metal, such as thin gauge steel or aluminum, which may be molded to the appropriate contour corresponding to the overall vehicle body design. The outer hood is attached to an inner hood 104 which contains support structures, such as support ribs, to provide stiffness and stability to the overall hood structure. The space 106 between the outer hood 102 and the inner hood 104 is usually empty. The design of such a hood, however, requires a balance and trade-offs between the energy absorption and the stiffness of the hood structure. Thus, energy absorption is compromised, if stiffness must be increased, and vice versa.

U.S. Patent Application Publication No. 2003/0213635 to Ryan et al. provides a hood assembly containing an external inflatable air bag cushion between an interior support frame and an exterior hood. The air bag is inflated to provide energy absorption in case of collision with a pedestrian. The energy absorption is provided mostly by the air bag inflation which requires costly equipment to be installed in the automobile.

U.S. Patent Application Publication No. 2006/0006698 to Ishikawa et al. provides a hood containing an outer hood skin and an inner hood frame, where the space between the outer skin and the inner frame is packed with a foamed metal. On impact, the foamed metal breaks down continuously to absorb the impact energy. The energy absorption is provided by the hood skin, the hood frame, and the breakdown of the foamed metal. Here, the design of the hood structure still requires a balance between stiffness and energy absorption.

Therefore, there remains a need for an economical hood design to decouple the stiffness and energy absorption requirements of an automobile hood, so that those two design criteria may be accomplished independent of each other, without requiring complicated trade-offs and balancing of those criteria.

SUMMARY OF THE INVENTION

An aspect of the present invention provides an automobile hood assembly containing an inner hood, an outer hood, and core disposed between the inner and outer hood. The inner hood is constructed of a fiber reinforced plastic (FRP) and configured to provide stiffness and stability to the hood assembly. The outer hood is constructed of a thin metal and has lower strength and stiffness than the inner hood. The core is constructed of an energy absorbing material that has lower strength and stiffness than the outer hood or the inner hood. The outer hood and the core are configured to provide energy absorption in case of collision with a pedestrian (or bicyclist, motorcyclist, or other persons exterior to the automobile). The inner hood is configured to provide strength and stiffness to the hood assembly. A problem in the design of prior art hoods is the trade-off requirement between the energy absorption and the stiffness of the hood structure. For example, energy absorption must be sacrificed to improve stiffness, and vice versa. The present hood eliminates the trade-off by decoupling energy absorption and stiffness, so that those two variables may be considered and designed independently. As such, a stiffness improvement of the present hood does not result in deterioration of energy absorption, and vice versa.

Another aspect of the present invention provides an automobile containing the hood assembly described above.

Methods for making and using the different aspects of the present invention are also provided.

Other aspects of the invention, including apparatuses, devices, kits, processes, and the like which constitute part of the invention, will become more apparent upon reading the following detailed description of the exemplary embodiments.

BRIEF DESCRIPTION OF THE DRAWINGS

The foregoing background and summary, as well as the following detailed description, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings

DETAILED DESCRIPTION OF THE PREFERRED EMBODIMENTS

Figure 1:
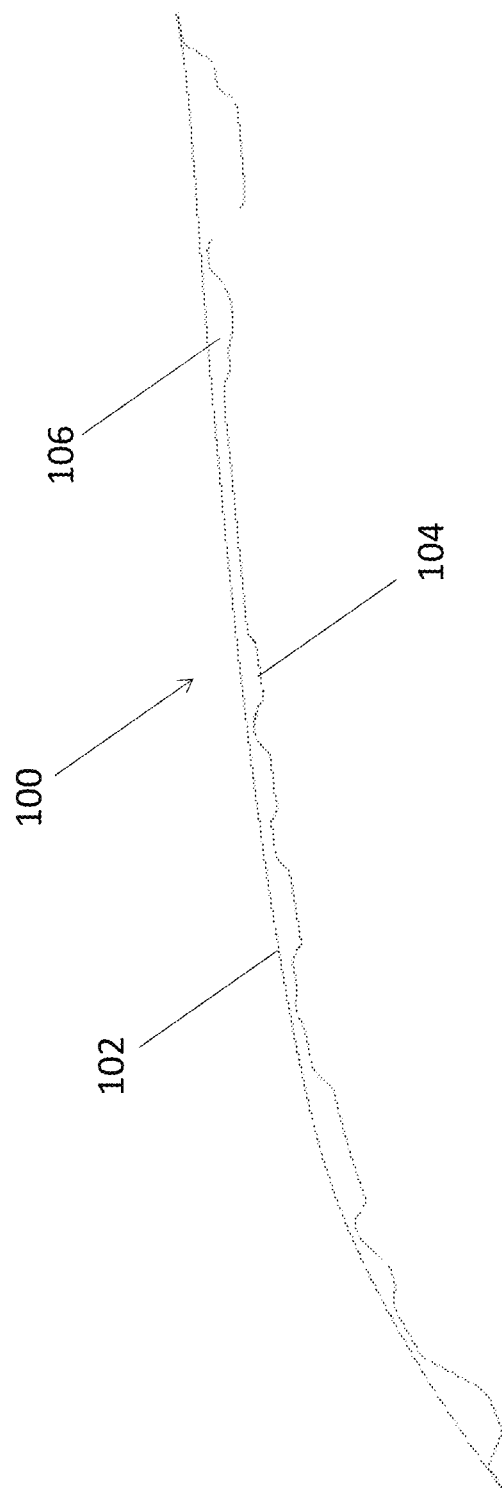
FIG. 1 is a drawing showing a cross-sectional view of a prior art automobile hood.

The exemplary embodiment of the present invention will now be described with the reference to accompanying drawings. The following description of the preferred embodiment is merely exemplary in nature and is in no way intended to limit the invention, its application, or uses.

For purposes of the following description, certain terminology is used in the following description for convenience only and is not limiting. The characterizations of various components and orientations described herein as being "front," "back," "vertical," "horizontal," "upright," "right," "left," "side," "top," "bottom," or the like designate directions in the drawings to which reference is made and are relative characterizations only based upon the particular position or orientation of a given component as illustrated.

These terms shall not be regarded as limiting the invention. The words "downward" and "upward" refer to position in a vertical direction relative to a geometric center of the apparatus of the present invention and designated parts thereof. The terminology includes the words above specifically mentioned, derivatives thereof and words of similar import.

Figure 2:
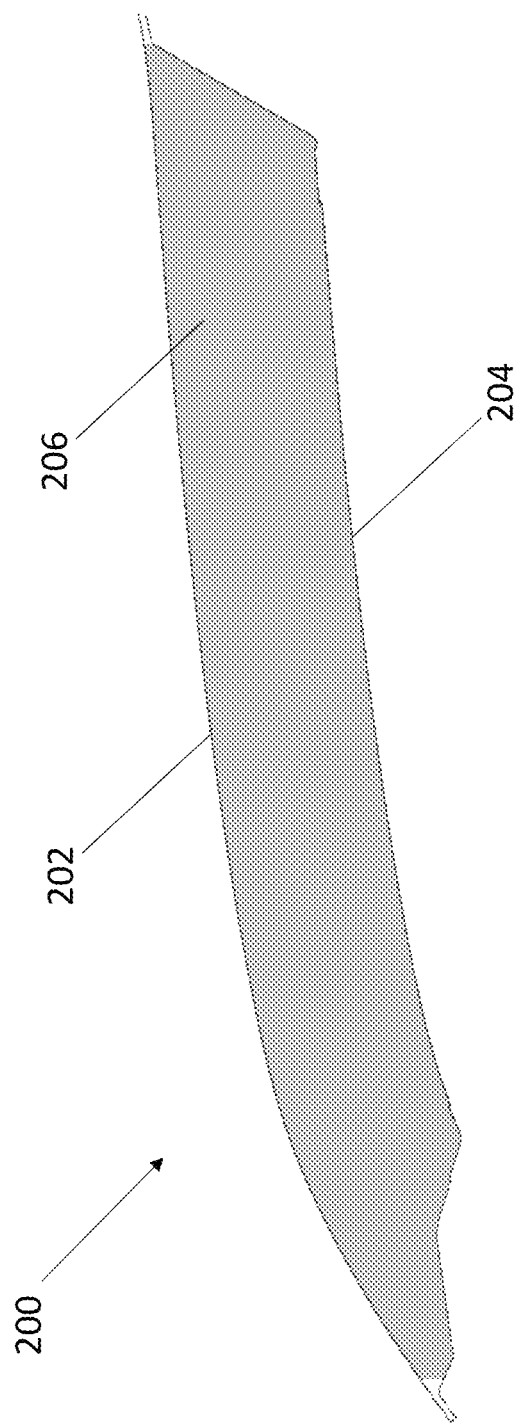
FIG. 2 is a drawing showing a cross-sectional view of an automobile hood in accordance with the present invention.
Figure 3:
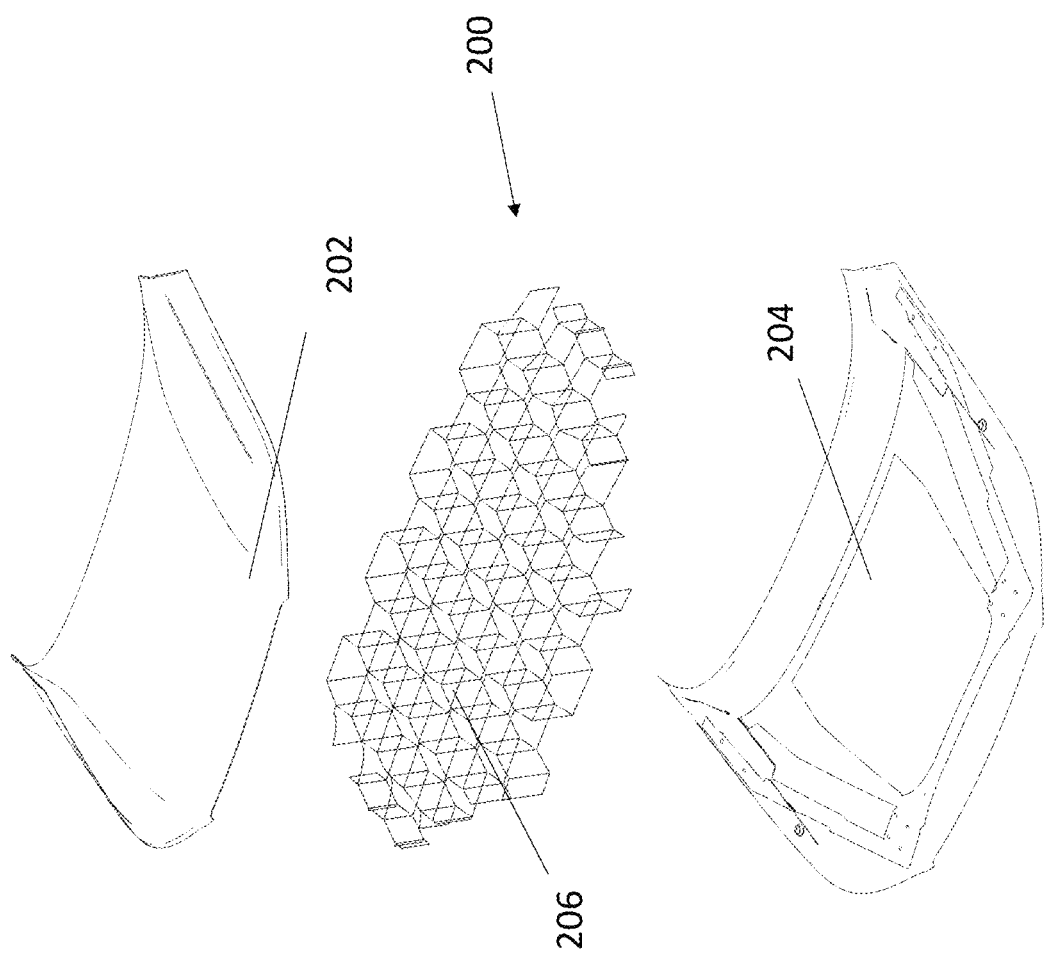
FIG. 3 is a drawing showing an exploded view of an automobile hood in accordance with the present invention.

Referring to FIGS. 2-3, the automobile hood assembly 200 containing an inner hood 204, an outer hood 202, and core 206 disposed between the inner hood 204 and outer hood 202. The inner hood 204, the outer hood 202, and the core 206 are made of different materials, where the material of the inner hood 204 is selected for its strength and stiffness, while the materials for the outer hood 202 and the core 206 are selected for their energy absorbing abilities. When assembled into a car, the outer hood 202 faces the exterior of the car, while the inner hood 204 faces the interior of the car, preferably the engine compartment. The hood assembly 200 is designed to decouple two incompatible functions of the automobile hood: 1) strength and stiffness to prevent unwanted vibration and to provide structural integrity to the hood; and 2) energy absorption to mitigate injury to pedestrian (or bicyclist, motorcyclist, or other persons exterior to the automobile) in the event of a collision.

The outer hood 202 is located on the exterior facing side of the hood assembly 200, and is made of a thin sheet of metal, such as steel, aluminum, or combinations thereof, or a polymer, such as polypropylene. As use herein "thin" refers to metals having a thickness of less than about 2 mm, preferably about 0.8 to about 1.2 mm. The outer hood 202 may typically be formed by metal stamping or other methods known in the art for the selected material.

The inner hood 204 is preferably made of a fiber reinforced plastic (FRP) material. The FRP contains a polymer matrix which is reinforced with a fiber, such as, fiberglass, carbon fiber, aramid fiber, natural fibers (e.g. hemp fibers or flax fibers), or combinations thereof. The polymer matrix may be a thermoset or thermoplastic. Examples of appropriate polymer matrices are, but not limited to, epoxy, vinylester, polyester, or combinations thereof. Although the thickness of the inner hood 204 may vary and may contain thick and thin sections, the inner hood 204 preferably has a thickness ranging from about 1 mm to about 4 mm, more preferably about 2 mm to about 3 mm. The inner hood 204 is calculated and configured to provide sufficient strength and stiffness for the overall hood assembly 200. As such, the strength/stiffness of the inner hood 204 is greater than that of the outer hood 202.

In certain embodiments, the inner hood 204 may contains portions that are further reinforced to provide optimal strength/stiffness to weight ratio. The reinforcement may be in increased thickness, increased fiber density, the use of high modulus fibers, or other methods known in the art. The inner hood 204 may contain a thin membrane supporting interconnecting patches of reinforcement in areas calculated to provide optimal stiffness and strength. The membrane may be constructed of a composite material, e.g. a compression molded composite, such as a sheet molding composite or a composite of non-woven materials. The reinforcement may be glued or co-cured with the membrane.

Figure 4:
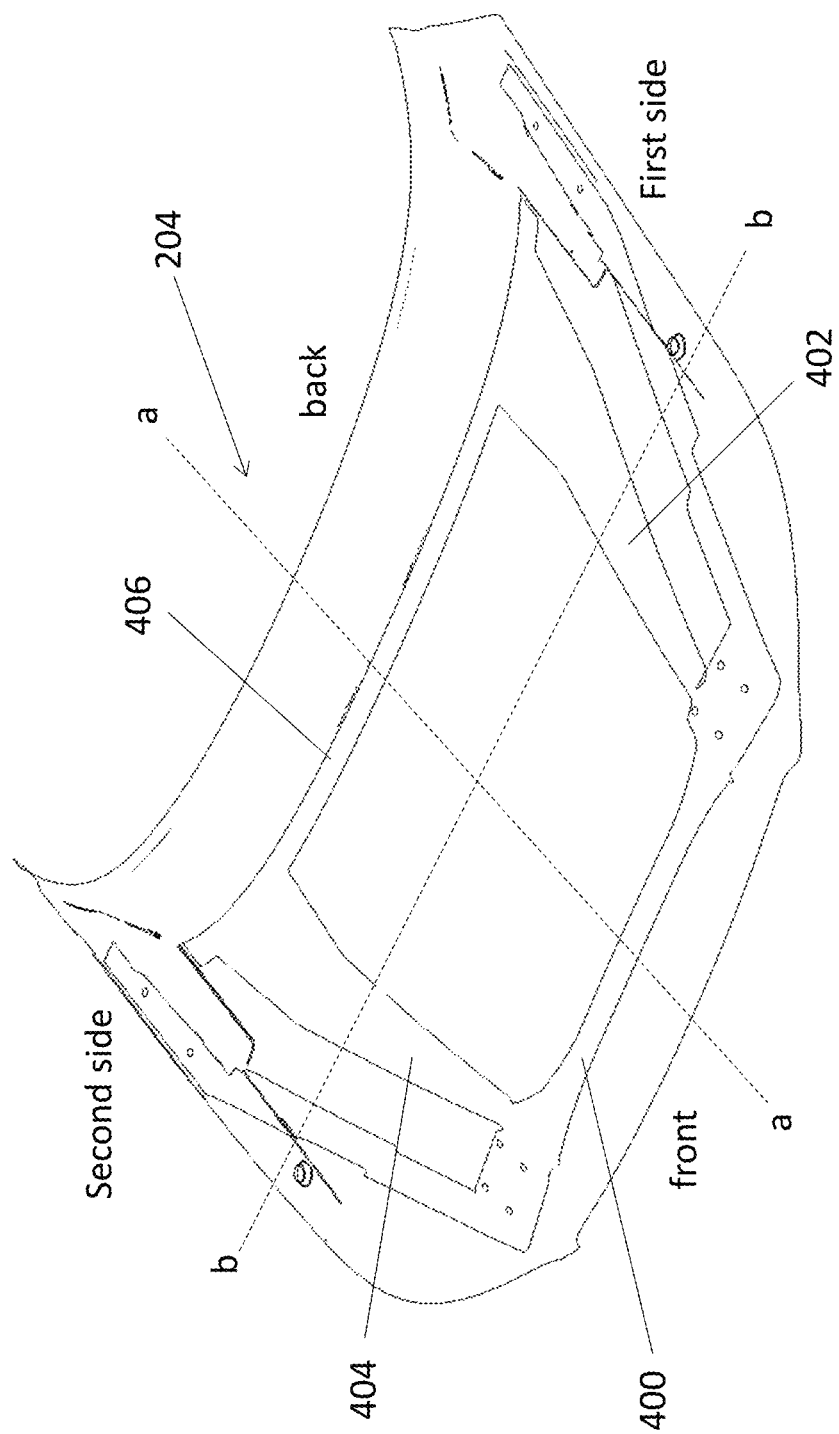
FIG. 4 is a drawing showing a perspective view of an inner hood with reinforced portions shown in dark gray.

Preferably, as shown in FIG. 4, the inner hood 204 has reinforced portions 400, 402, 404, and 406. As illustrated in FIG. 4 the front end refers to the end of the inner hood 204 that is furthest toward the front of the automobile when mounted therein; likewise, the back end is the end of the inner hood 204 that is closest to the wind shield of the automobile when properly mounted. The reinforced portions include a front reinforced portion 400, side reinforced portions 402 and 404, and back reinforced portion 406. The front reinforced portion 400 includes an area locating between the front of the inner hood 204 and the side-to-side center line b-b and extending from about 80% to about 90% of the width (first side to second side distance) of the inner hood 204. Back reinforced portion 406 includes an area locating between the back of the inner hood 204 and the side-to-side center line b-b and extending about 80% to about 100% of the width of the inner hood 204. The first side reinforced portion 402 includes an area locating between the first side and the front-to-back center line a-a and extending about 70% to about 80% of the total front to back distance of the inner hood 204. The second side reinforced portion 404 including an area locating between the second side and the center line a-a and extending about 70% to about 80% of the total front to back distance of the inner hood 204. Preferably, the reinforced portions 400, 402, 404, and 406 are connected to form approximately a rectangular reinforcement area of the inner hood 204. In addition to reinforced portions 400, 402, 404, and 406, other areas of the inner hood 204 may also be reinforced as needed. For example, areas for latch and hinge attachments may require additional reinforcement. Overall, the areas of reinforcement are preferably less than 60% of the total area of the inner hood 204, more preferably less than 50%, most preferably less than 40%.

The inner hood 204 may be manufactured as a single piece or two or more joined pieces. The inner hood 204 may be formed by methods known in the art, such as compression molding, wet compression molding, autoclaving, resin transfer molding, vacuum injection, or combinations thereof. Other methods for FRP forming are also contemplated by the present invention. When a membrane is used, resin wetted fibers are arranged on the membrane in a desired pattern, e.g. the reinforcement pattern disclosed above. The membrane and fibers are then molded and cured to produce the inner hood 204. The inner hood 204 and outer hood 202 may be attached at their respective peripheral regions by mechanical means, such as riveting, gluing, folding, crimping, bolting, or combinations thereof.

The core 206 is located in the cavity formed between the outer hood 202 and the inner hood 204, and is preferably attached to the outer hood 202 and/or the inner hood 204, e.g., by an adhesive. Because the adhesive should bear little or no load, the adhesive strength should not be a consideration in the design. Preferably, the core 206 fills at least 80%, more preferably at least about 90% of the cavity between the inner and outer hoods 202 and 204. The core 206 and the outer hood 202 is configured to maximize energy absorption to mitigate injury to pedestrian in the event of a collision. To that end, the core 206 is formed from a light weight material (lower density than the inner and outer hoods 202 and 204) having a tensile strength less than that of the outer hood 202. The core 206 may contain a polymeric foam, such as, but not limited to, polyurethane, polystyrene (PS), expanded PS, ethylene-vinyl acetate (EVA), polyethylene (PE), nitrite rubber, polyimide, polypropylene (PP), expanded PP, polyvinyl chloride (PVC), polyurethane, or combinations thereof. In an embodiment, the core 206 has a honeycomb structure as known in the art. The honeycomb structure may be formed from aluminum, paper, cardboard, or a polymer.

The hood assembly 200 may be manufactured by laying a precut core 206 onto the inner hood 204. The outer hood 202 is then stacked on the core 206 and attached to the inner hood 204, preferably at their peripheral portions, to sandwich the core 206 in between the inner and outer hoods 204 and 202. The core 206 is preferably in adhesive contact with the inner hood 204 and/or the outer hood 202. The adhesive may be placed on the core and/or the inner and outer hoods 204 and 202 before or during assembly. Alternatively, the core 206 is first injected and cured on the inner hood 204; then the outer hood 202 is bonded to the core 206 and attached to the inner hood 204. This alternative method is most applicable for cores 206 made from a polymeric foam which may be injected as a liquid and ultimate cured as a foam. When assembled, the inner hood 204 provides strength and stiffness needed for the hood assembly 200, while the outer hood 202 and the core 206 provide energy absorption in the event of impact, e.g., with a pedestrian, bicyclist, motorcyclist, or other persons exterior to the automobile. By that construction, the strength and stiffness of the hood assembly 200 are decoupled from the energy absorption, such that the strength and stiffness may be adjusted without significantly affecting the energy absorption and vice versa.

Without further description, it is believed that one of ordinary skill in the art can, using the preceding description and the following illustrative example, make and utilize the present invention. The following example is given to illustrate the present invention. It should be understood that the invention is not to be limited to the specific conditions or details described in the example

EXAMPLE

An automobile hood constructed according to the present invention (Design B) is compared to one constructed as shown in FIG. 1 and described above (Design A). Design B contains a core having a honeycomb structure made of hexagonal cell with a density of 110 mm and a thickness of approximately 8 mm. The core material is a polypropylene with a Young's modulus of 2300 MPa and a density of 1.02 g/cm3. The inner hood structure is made of a SMC membrane containing carbon fibres and a vinylester matrix (2 mm thick). The material has a Young's modulus of 62100 MPa and a density of 1.48 g/cm3. Reinforced fibre patches (1 mm thick) are glued to the SMC membrane in a pattern similar to that of FIG. 4. The patches are made of a carbon fibre/epoxy material with Young's moduli of E11=94500 MPa, E22=8000 MPa, G12=4000 MPa and a density of 1.45 g/cm3. The outer hood of Design A is identical to the outer hood of Design B which is made of aluminum.

Table 1 shows the normalized result of Design A and Design B:

TABLE 1

| | Mass (normalized) | Eigenfrequency (normalized) | | |
| --- | --- | --- | --- | --- |
| | | 1$^{st}$ | 2nd | 3rd |
| Design A | 1 | 1 | 1 | 1 |
| Design B | 0.75 | 1.27 | 1.25 | 1.3 |

The first three eigenfrequencies indicates the stiffness of the hood and were obtained using linear eigenvalue analysis of the hood designs. Table 1 shows that Design B offers a weight saving of 25%, with a corresponding increase in stiffness of 25 to 30%. Design B is lighter and stiffer than Design A.

Although certain presently preferred embodiments of the invention have been specifically described herein, it will be apparent to those skilled in the art to which the invention pertains that variations and modifications of the various embodiments shown and described herein may be made without departing from the spirit and scope of the invention.

What is claimed is:

1. An automobile hood assembly comprising an outer hood made from a shaped thin sheet material having a thickness less than 2 mm, an inner hood made from a fiber reinforced plastic including a polymer matrix reinforced with fiber made from combinations including fiberglass, carbon fiber, aramid fiber, or natural fibers, the inner hood having a thickness of between 1 and 4 mm, the inner hood being stronger and stiffer than the outer hood, and a core positioned in one or more cavities formed between the inner and outer hoods when said outer hood and inner hood are respectively connected one to the other around respective peripheries of each hood, said core filling at least 80% of said one or more cavities, wherein the core is made from an energy absorbing material and said outer hood and core, in combination, provide energy absorption for objects and/or persons in collision with said outer hood and said inner hood provides overall stiffness to said hood assembly.

2. The hood assembly of claim 1, wherein the core is in adhesive contact with the inner hood and/or the outer hood.

3. The hood assembly of claim 1, wherein the outer hood is made of thin gauge steel or aluminum.

4. The hood assembly of claim 1, wherein the inner hood comprises areas of reinforcement.

5. The hood assembly of claim 4, wherein the areas of reinforcement comprises increased thickness, increased fiber density, high strength fibers, or combinations thereof.

6. The hood assembly of claim 4, wherein areas of reinforcement are less than 60% of the total area of the inner hood.

7. The hood assembly of claim 1, wherein the core comprises a foam polymer.

8. The hood assembly of claim 7, wherein the foam polymer is polyurethane, polystyrene, ethylene-vinyl acetate (EVA), polyethylene (PE), nitrile rubber, polyimide, polypropylene, polyvinyl chloride (PVC), or combinations thereof.

9. The hood assembly of claim 1, wherein the core comprises a honeycomb structure.

10. The hood assembly of claim 9, wherein the honeycomb structure is made of aluminum or a polymer.

11. The hood assembly of claim 1, wherein the outer hood and the inner hood are attached by one or a combination of riveting, gluing, folding, crimping, bolting.

12. The hood assembly of claim 1, wherein the inner hood is configured to provide stiffness and stability to the hood assembly, and the outer hood is configured to provide energy absorption to the hood assembly.

13. The hood assembly of claim 1, wherein the inner hood comprises a membrane supporting interconnecting reinforcement patches.

14. An automobile comprising the hood assembly of claim 1.

15. The automobile of claim 13, wherein the inner hood faces the interior of the automobile and the outer hood faces the exterior of the automobile.

16. The automobile of claim 13, wherein the outer hood is made of thin gauge steel or aluminum.

17. An automobile hood assembly comprising an outer hood made from a shaped thin sheet material having a thickness less than 2 mm, an inner hood made from a fiber reinforced plastic including a polymer matrix reinforced with fiber made from combinations including fiberglass, carbon fiber, aramid fiber, or natural fibers, the inner hood having a thickness of between 1 and 4 mm, the inner hood being stronger and stiffer than the outer hood, and a core positioned in one or more cavities formed between the inner and outer hoods when said outer hood and inner hood are respectively connected one to the other around respective peripheries of each hood, said core filling at least 80% of said one or more cavities, the inner hood being reinforced along selective portions thereof, the reinforced areas being less than 60% of the overall area of the inner hood, the areas of reinforcement comprising increased fiber reinforced plastic thickness, increased fiber density, high strength fibers, or combinations thereof, and wherein the core is made from an energy absorbing material and said outer hood and core, in combination, provide energy absorption for objects and/or persons in collision with said outer hood and said inner hood provides overall stiffness to said hood assembly.

* * * * *